Jan. 31, 1967 — E. LINSKER — 3,301,333
COMPACT AUTOMATIC MACHINE TOOL
Filed July 27, 1964 — 2 Sheets-Sheet 1
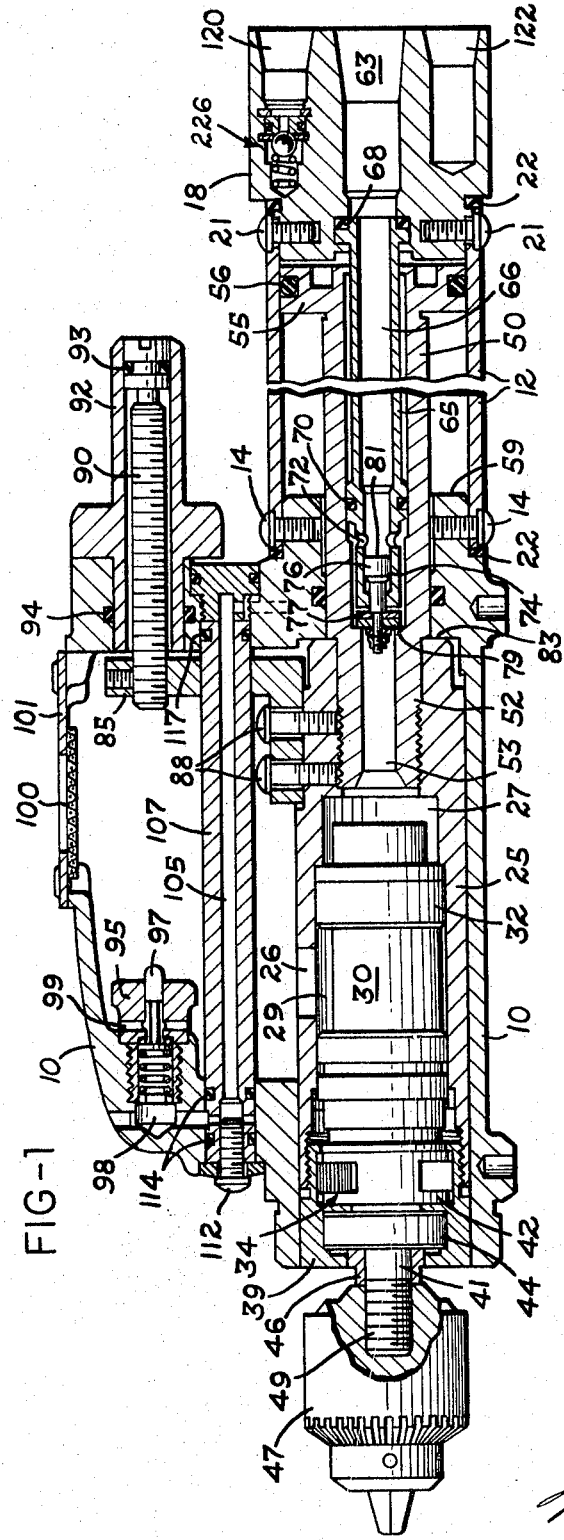
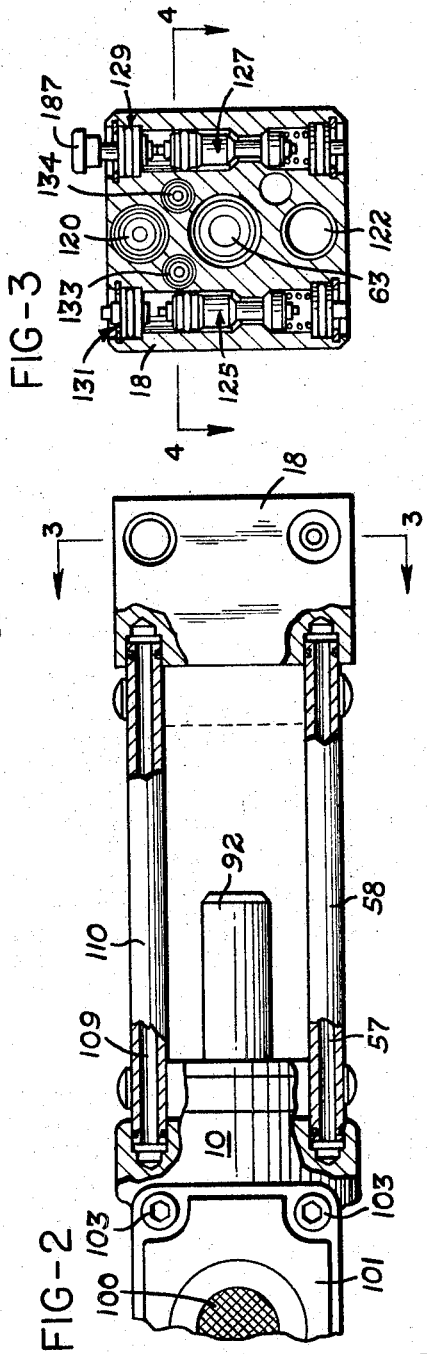
INVENTOR.
EUGENE LINSKER
BY
*Marechal, Biebel, French & Bugg*
ATTORNEYS Jan. 31, 1967  E. LINSKER  3,301,333
COMPACT AUTOMATIC MACHINE TOOL
Filed July 27, 1964  2 Sheets-Sheet 2
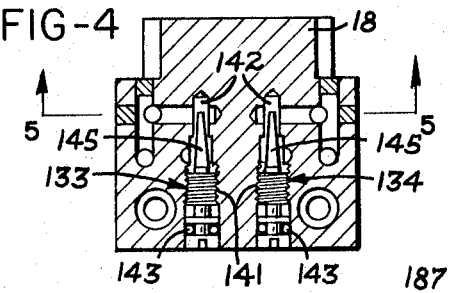
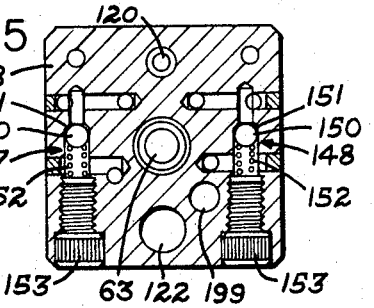
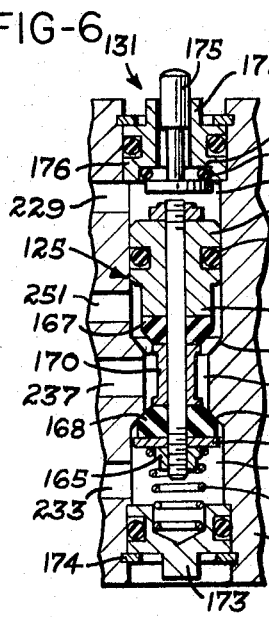
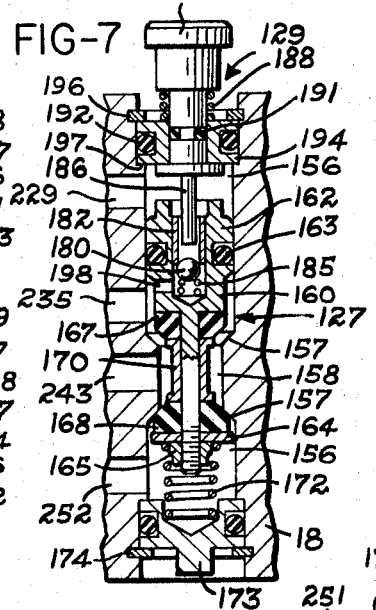
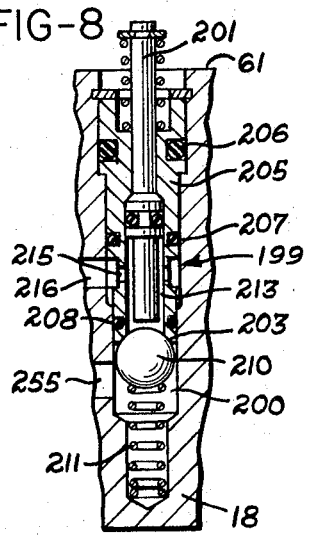
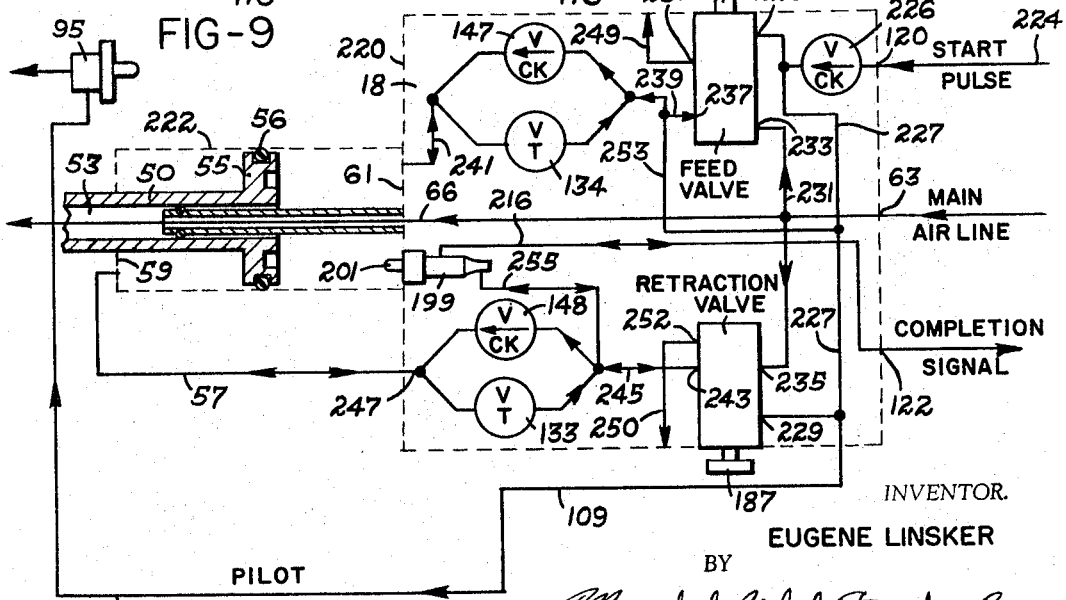
INVENTOR.
EUGENE LINSKER
BY
Marechal, Biebel, French & Bugg
ATTORNEYS United States Patent Office 3,301,333
Patented Jan. 31, 1967

3,301,333
COMPACT AUTOMATIC MACHINE TOOL
Eugene Linsker, Dayton, Ohio, assignor to Rockwell Manufacturing Company, Pittsburgh, Pa., a corporation of Pennsylvania
Filed July 27, 1964, Ser. No. 385,262
9 Claims. (Cl. 173—19)

This invention relates to machine tools and more particularly to a compact rotary cutting machine tool which automatically feeds and retracts the tool along a linear path.

Recent market trends toward the automated machining of a part have evidenced the need for compact machine tools which are capable of being arranged close together in order to perform a number of machining operations, either simultaneously or in sequence such as drilling, tapping, countersinking, etc., while the part remains at one station. For example, with a complex part requiring a number of machining operations, the closer the machine tools can be arranged together results in accomplishing more machining operations while the part remains at one station where the part can be easily indexed. Consequently, the additional time required for transferring the part from station to station for separate operations is avoided.

Furthermore, it has been found desirable for the machine tool to contain its own operating controls so that when the machine tool is signalled, the tool will automatically advance, perform the desired operation and then return to the starting position. The self-contained controls are also advantageous in that they simplyify arranging of the tools close together and this reduces the setup time required. For example, with a fluid-operated tool having self-contained controls, it is unnecessary to set control valves and to connect separate fluid lines to the valves for controlling each different operation of the tool. Furthermore, in order to provide versatility, it is economically desirable for the machine tool to be capable of performing many different types of operations. This requires that each tool have self-contained adjustments for all movements.

Hence, the present invention is concerned with a compact fluid-operated machine tool which employs a pneumatic rotary motor to drive the tool and a linear action motor to control the linear feed and retraction of the tool, and as a primary object, the present invention provides a compact pneumatic machine tool with a self-contained compact mechanism for automatically controlling the rotary and linear movements of the tool.

As another object, the present invention provides a pneumatic machine tool with a compact, self-contained control system which will operate automatically after receiving either a pneumatic starting signal or a manual starting action.

A further object is to provide a pneumatic machine tool with the major portion of its automatic control system compactly constructed in a fitting which is attached to the end of the machine tool and thereby provides easy accessibility for adjustments and servicing.

Still another object of the present invention is to provide a compact pneumatic machine tool which contains a readily adjustable mechanism for controlling the linear travel of the tool.

As another object, the present invention provides a compact pneumatic machine tool with a novel automatic self-contained control system which includes both a control for signaling upon completion of the operation and a manual safety control for preventing completion of the cycle when necessary.

Other objects and advantages of the invention will be apparent from the following description, the accompanying drawings and the appended claims.

In the drawings:

FIG. 1 is a broken sectional view taken longitudinally showing the basic tool construction in accordance with the invention, and with the rotary pneumatic motor shown in elevation;

FIG. 2 is a partial plan view showing the air passageways which run longitudinally of the tool;

FIG. 3 is a sectional view of the control fitting showing the location of the two pressure-operated three-way control valves as viewed along the line 3—3 of FIG. 2;

FIG. 4 is a sectional view of the control fitting showing the rate control valves for the linear action motor as viewed along the line 4—4 of FIG 3;

FIG. 5 is another sectional view of the control fitting showing the check valves for the linear action motor as viewed along the lines 5—5 of FIG. 4;

FIG. 6 is an enlarged sectional view of the pressure-operated three-way feed control valve and the manual retraction valve as shown in FIG. 3;

FIG. 7 is an enlarged sectional view of the pressure-operated three-way retraction control valve and the manual start valve as shown in FIG. 3;

FIG. 8 is an enlarged sectional view of the cycle completion signaling valve which is mounted longitudinally within the control fitting; and FIG. 9 is a schematic diagram showing the pneumatic control system which is primarily contained within the control fitting.

Referring to the drawings which illustrate preferred embodiments of the present invention, the basic structure of the machine tool includes a housing 10 and a tubular portion 12 extending from one end of the housing and secured thereto by the screws 14. On the rearward end of the tubular portion 12 is mounted a control fitting 18 which is partially recessed within the tubular portion 12 and retained by the machine screws 21. The O-rings 22 spaced on each end of the tubular portion 12 are provided to form an air tight seal with the control fitting 18 on one end and the housing 10 on the other. Slidably mounted within the housing 10 is a hollow headpiece 25 including an interior having an air supply chamber 27 and a forwardly spaced exhaust chamber 29 of slightly greater diameter which is open to exhaust through a series of radially spaced openings 26.

A rotary air motor 30, for example of a well-known sliding vane type, is mounted within the headpiece 25, and includes a land 32 which separates the supply and exhaust chambers from each other, as shown. This motor may include a suitable planetary reduction gearing shown generally at 34, which is secured in place by a retainer 39 threaded into the forward end of the headpiece 25. The output of the gear set is through a spindle 41 which is formed integrally with the cage 42, and journalled within a forward bearing 44 which is supported within the retainer 39. A seal ring 46 surrounds the forward end of the spindle 41, and secures the inner race of bearing 44.

A conventional chuck 47 is mounted on the spindle 41 by the threads 49. This chuck may carry a rotary cutting tool, such as a drill, reamer, countersink or the like, and the entire unit, including the headpiece 25 is adapted to move linearly within the housing 10 while the motor 30 rotates the cutting tool. It is to be understood, of course, that the chuck 47 may be replaced by some other form of tool holder, as for example, a tapping head, collet or multiple spindle head which may be attached to the spindle by means other than threaded, such as a tapered socket connection.

The linear movement of the headpiece 25 and enclosed air motor 30 is derived from a linear action pneumatic motor which includes a hollow piston rod 50 extending rearwardly of the headpiece 25, and preferably removably attached by the threaded portion 52. The piston rod includes an internal passage 53 which connects with the chamber 27 to supply air for the rotary motor. A piston 55, preferably carrying a surrounding O-ring 56, or equivalent sealing member, is formed as an integral part of the hollow piston rod 50. Of course, the piston 55 could be formed separately and joined to the piston rod 50.

As the linear action motor is constructed to be a double-acting type, an air passageway 57 (FIG. 2) is provided within the tube 58, which serves to connect the main control fitting 18 to the housing 10 where an internal passageway (not shown) leads to the end face 59 of the housing 10 forming the forward end of the linear action motor.

The main air supply line is connected to the opening 63 located centrally within the fitting 18. Mounted on the forward end of the control fitting 18 is a hollow tube 65 which contains a passageway 66 connecting on the rear end with the main air supply opening 63 and on the forward end with the internal passageway 53 within the piston rod 50. The hollow tube 65 is sealed air tight to the control fitting 18 by an O-ring 68. Another O-ring 70 is located near the opposite end of the hollow tube 65 and serves to provide an air tight seal between the hollow tube and the inside surface of the hollow piston rod 50 which slides back and forth over the tube.

The ports 72 allow the air supply through the hollow tube 65 to enter the internal passageway 53 surrounding the reduced end portion 74 of the hollow tube 65. Slidably mounted within the reduced end portion 74 is a valve stem 76 which supports a resilient sealing washer 77 which seats against the shoulder 79 formed within the hollow piston rod 50 when the piston rod is fully retracted. This automatically shuts off the air supply to the rotary motor 30 when the tool has completed its cycle. The air pressure against the end surface 81 of the valve stem 76 normally holds the valve stem in an outwardly extended position. This slidable mounting of the valve stem 76 prevents the hollow piston rod from bottoming on the resilient washer 77 which would wear down the washer since the hollow headpiece 25 is constructed to bottom against the housing 10 along the surface 83.

Mounted for reciprocating movement with the headpiece 25 is a lever 85 which extends radially outwardly and is secured to the headpiece 25 by the machine screws 88. Threaded through the end portion of the lever 85 is an adjustable stop screw 90 which serves to accurately define the limit of the forward linear feed of the headpiece 25. The stop screw 90 is enclosed for telescoping movement within a tubular casing 92 which serves to protect the threads on the stop screw from being damaged and to maintain the accessibility to the adjusting screw. The O-ring 93 forms an air tight seal between the stop screw and the casing as the screw telescopes within the casing. The casing 92 is retained by two screws (not shown) extending through the housing 10 and is sealed therein by the O-ring 94.

Mounted in the forward end of the housing 10, and axially aligned with the stop screw 90, is a normally closed two-way valve 95 which includes a slidable valve stem 97 which is depressed by the stop screw 90 as the headpiece 25 reaches its extended position. When the valve stem 97 is depressed, air pressure within the chamber 98 is allowed to escape through the openings 99 into the internal portion of the housing 10 and out through the screened opening 100 in the cover plate 101 which is fastened to the housing by the screws 103. The opening 100 also serves to exhaust the air flowing through the opening 26 from the rotary motor 30.

Pressurized air is supplied to the pilot valve 95 through a passageway 105 within a hollow tube 107 which is mounted within the housing 10 on an axis parallel to the axis of the headpiece 25 and hollow piston rod 50. At the rearward end of the hollow tube 107, the passageway 105 is connected by an internal passageway (not shown) within the housing 10 to the passageway 109, FIG. 2, within the tube 110 which leads rearwardly to the main control fitting. An opening is provided within the lever 85 in order for the lever to slide over the hollow tube 107 which enables the tube 107 to serve as an anti-torque rod for the headpiece 25 as it extends and retracts. The forward end of the hollow tube 107 is provided with an air tight seal by the screw 112, and O-ring 114. The opposite end of the tube is sealed by the O-rings 117.

Referring to FIG. 3, which shows a section view of the main control fitting 18, connections are made to the machine tool with the main air supply line connected to the opening 63, a starting air impulse line to the opening 120 and a completion signal air line connected to the opening 122. Mounted within the fitting 18 are two pressure-operated three-way valves, generally referred to as a feed valve 125 and a retraction valve 127. Partially constructed within the retraction valve 127 and partially extending upward therefrom is a manual start valve generally referred to as 129. Positioned above the feed valve 125 to close the chamber is a manual retraction valve, generally referred to as 131. Both the manual start and manual retraction valve assemblies are constructed as two-way valves.

The feed rate control valve 134 and retraction rate control valve 133, shown in detail in FIG. 4, control the rate at which the air flows from the double-acting linear air motor through the passageways connected to the space on opposite sides of the piston 55.

Referring to FIG. 4, the two-rate control valves 133 and 134 are identical and include a threaded valve stem 141 which is screwed into the counterbored chamber 142 and are provided an air tight seal by the O-rings 143. The ends of the valve stems 141 have tapered portions 145 which are adjusted in and out of the chamber 142 in a manner the same as a conventional needle valve.

The feed check valve 148 and retraction check valve 147, shown in FIG. 5, are connected in parallel with the corresponding rate control valves in order to force the air leaving the linear action motor through the rate control valves, but, on the other hand, to prevent the rate control valves from restricting the flow of air entering the linear motor. Both of the check valves include a ball 150 which is normally retained against the seat 151 by the compression springs 152. The socket head screws 153 serve to retain the spring and ball within the chamber of the check valve.

Referring to FIGS. 6 and 7 which show the detailed construction of the three-way feed and retraction valves, 125 and 127, respectively, both of the valves include a chamber 156 having two beveled seating surfaces 157 which extend inwardly forming a throat area 158 within the chamber. The valve stems 159 and 160 include head portions 161 and 162, respectively, which are adapted to center the stem within the chamber. The O-rings 163 serve to provide an air tight seal between the head portion and the wall of the chamber 156. Retained on the valve stems by the washer 164 and nut 165 are a pair of resilient washers 167 and 168 which are adapted to seat alternately against the beveled surfaces 157 and are spaced apart by the spacer 170. The bottom resilient washer 168 is normally held against the beveled surface 157 by the compression spring 172 which is spaced between the washer 164 and the plug 173 which is placed within the bottom of the chamber and is secured therein by the retaining ring 174.

At the top of the feed valve chamber is mounted the manual retraction valve 131 which seals off the top of the chamber 156 from atmosphere air. The manual retraction valve, which is a two-way type valve, includes a valve stem 175 having a head portion 176 which normally holds the O-ring 177 against the valve seat 178, formed within the plug 179. The operation and function of this valve, as well as previously described valves, are explained later.

The three-way retraction valve 127, as mentioned above, is constructed in a manner similar to the three-way feed valve with the exception that the manual start valve 129 may be included. This manual start valve is primarily constructed concentrically arranged within the head portion 162 of the valve stem 160 in order to permit air pressure to bypass, in effect, the O-ring 163. The manual start valve essentially incldes a ball 180 which is normally held in sealing contact with the pressed-in valve sleeve 182 by a compression spring 185. A slidable rod 186 including a thumb button 187 on the top end is normally held upwardly by the compression spring 188. The O-rings 191 and 192 serve to provide an air tight seal between the rod 186 and plug 194 and the wall of the valve chamber 156. A retaining ring 196 serves to hold the plug 194 against the shoulder 197 of the valve chamber. As the button 187 is depressed the rod 186 will unseat the ball 180 which allows the air pressure on the bottom side of the head portion 160 to escape through the port 198 and into the sleeve 182 to pressurize that portion of the valve chamber above the head portion 162. The increased force produced by the air pressure on the top side of the head portion 162 overcomes the force provided by the spring 172 causing the valve stem to move downwardly so that the resilient washer 167 seats against the beveled surface 157 thus unseating the resilient washer 168.

Referring to FIG. 8, a completion signal valve 199 is mounted within a chamber 200 formed within the control fitting 18 and on an axis parallel with the axis of the piston rod 50. This valve is adapted to open when the piston 55 is completely retracted so that it depresses the push rod 201 which extends partially out from the surface 61 of the control fitting. A valve seat 203 is formed in the end of a tubular extending plug 205 which is inserted within the valve chamber 200. The O-rings 206, 207 and 208 are provided to seal the outer surface of the plug 205 with the wall of the valve chamber 200 in order to form air tight chambers on each side of the ball 210 which is normally held against the seat 203 by the compression spring 211. As the push rod 201 is depressed by the piston 55, the ball is unseated allowing air pressure below the tubular plug to pass up into the chamber 213 within the plug and surrounding the push rod 201. The air pressure is then transferred through the port 215 and through a passageway 216 within the control fitting 18 to the opening 122 where a line is connected to transfer the air pressure signal to the starting mechanism of another tool, for example, one which may be set up to perform the next operation of a sequence.

Referring to the schematic diagram, shown in FIG. 9, the dotted line 220 represents the outer surfaces of the control fitting 18 and the dotted line 222 represents the tubular portion 12 of the double-acting linear motor. The automatic operation of the machine tool begins when a pilot air pulse is introduced into the opening 120 through a suitable air line 224. The air pressure is transferred through a suitable check valve 226, also shown in FIG. 1, through an internal passageway 227 to the port 229 which is connected to the valve chambers 156 of the three-way feed and retraction valves, above the head portions 161 and 162 respectively. At the same time, the pilot air pressure is transferred through the passageways 109 and 105 to pressurize the chamber 98 of the two-way pilot valve 95. The check valve 226 serves to maintain the pressure within these valve chambers after the starting pulse ends.

The main air supply line which is connected to the opening 63 and supplies the rotary air motor through the passageways 66 and 53, also supplies air through the internal passageway 231 to the port 233 of the three-way feed valve and to the port 235 of the three-way retraction valve. From the port 237 of the three-way feed valve, an internal passageway 239 connects to the retraction check valve 147 and the retraction rate control valve 134 which are arranged in parallel and from which a passageway 241 leads to the forward face 61 of the control fitting 18 to provide air pressure on the rearward side of the piston 55 to feed the piston forward.

From the port 243 of the three-way retraction valve, the passageway 245 leads to the feed check valve 148 and feed rate control valve 133, also arranged in parallel and from which another internal passageway 247 leads to the external passageway 57 within the tube 58 which supplies air pressure through an opening (not shown) in the face 59 of the housing 10 and to the forward side of the piston 55 in order to retract the piston rod. Exhaust passageways 249 and 250 are connected respectively to the three-way feed valve at the port 251 and to the retraction valve at port 252.

When a starting pulse is received through the opening 120, both of the valve stems of the three-way feed and retraction valves are forced downwardly due to the air pressure which is introduced above the head portion of the valve stems. This causes air pressure to be introduced into the passageway 239 which flows primarily through the check valve 147 and into the space behind the piston 55 through the passageway 241. At the same time, the three-way retraction valve connects the passageway 245 with the exhaust passageway 250 which allows the air on the forward side of the piston 55 to flow through the passageways 57 and 247 and through the feed rate control valve 133 out through the exhaust passageway. An internal bleed passageway 253 is provided to maintain the pilot pressure within the passageway 227 during forward feed in the event a slight leakage occurs in the pilot system.

As the piston rod 50 and the headpiece 25 reach the end of the forward travel, the stop screw 90 actuates the two-way pilot valve 95 and thereby releases or dumps the pilot pressure within the passageways 105, 109 and 227, since the original starting pressure through the opening 120 was only a pulse and not a continuous pressure. Also, the pressure on the top side of both of the three-way valve stems is released which causes the stems to move upward due to the force of the compression springs 172 and this, in turn, causes the pressure within the control system to reverse so that air flows through the check valve 148 to the space on the forward side of the piston 55 causing the piston to retract. The air behind the piston 55 then flows backward through the passageway 241 and through the retraction rate control 134 and out through the passageway 239 which is connected to the exhaust passageway 249.

As the piston 55 reaches its retracted starting position, the piston depresses the push rod 201 of the completion signal valve 199, shown also in FIG. 8, thus allowing the pressurized air within the internal passageway 255 to enter the passageway 216 and flow out through the opening 122 to operate a completion signal device or to start the machine tool which is to perform the next sequential machining operation.

On the next cycle of the operation, it will be seen that when the passageway 245 is open to exhaust, the passageway 255 is also open to exhaust due to the internal connection. Thus, when the passageway 255 is open to exhaust, the pressurized air in the completion signal line and in the passageway 216 will flow backward through the completion valve, which now acts as a check valve, as can be seen in FIG. 8, and thereby releasing the pressure within the completion signal line. It thus becomes apparent that this completion signal valve actually serves as a three-way valve in order to prepare the system for another completion signal.

When it is desired to manually start the automatic operation of the tool, it will be seen that the manual start valve, shown in FIG. 7 and generally referred to as 129, will serve the same purpose when depressed as a starting air pulse through the port 229. That is, by depressing the button 187 air is allowed to flow from the line passageway 231 through the port 235 and around the ball 180 in order to pressurize that portion of the valve chamber 156 above the valve stem 160 in the same manner as would an air starting pulse through the port 229. It therefore becomes apparent, that the novel control system shown offers the feature of either a manual start or a start by a remotely originating air pulse.

It is often desirable to have a control on a pneumatic machine tool which will prevent the tool from completing an operation once started, as for example, if a tool element should break during the cycle period. This control is also offered in the compact control system included within the fitting 18 and is shown in FIG. 6 as the manual retraction valve 131. In operation, when the valve stem 175 is depressed, air pressure within the passageway 227, 109 and 105 is exhausted which thereby releases the pressure on top of the valve stems of the three-way valves causing the valve stems to move upward which will, as explained above, introduce air pressure within the passageway 57 and open the passageway 241 to exhaust. This in turn, returns the piston 55 to its retracted starting position.

It therefore becomes apparent from the above description that the compact machine tool and the included automatic control system provide a novel machine tool with a number of advantages and features. For example, the tool provides compact controls for either automatic or manual starting and stopping. In addition, controls are provided for adjusting either the rate of feed or the rate of retraction of the tool plus a control for adjusting the amount of linear feed. Furthermore, the machine tool compactly provides an automatic signalling device to indicate when the cycle is completed as well as an automatic control to shut off the rotary air motor at the end of the cycle. As another advantage and feature, the machine tool provides easy accessibility to all of the compact adjustable and manual controls.

While the form of apparatus herein described constituets a preferred embodiment of the invention, it is to be understood that the invention is not limited to this precise form of apparatus, and that changes may be made therein without departing from the scope of the invention which is defined in the appended claims.

What is claimed is:

1. A compact power tool of the character described comprising, means defining a housing including a forward portion and a rear tubular portion, a piston slidably mounted in said tubular portion, a piston rod extending from said piston forming a fluid linear action motor, a headpiece supported for linear movement within said housing and secured for movement with said piston, a rotary fluid motor mounted in said headpiece, supply means for directing power fluid to said motor, means for mounting a cutting tool for rotation by said rotary motor and for linear movement with said headpiece, a fitting extending from said tubular portion and including passageways for supplying fluid pressure to said linear action motor and to said supply means of said rotary motor, pressure-operated valve means mounted within said fitting for controlling fluid through said passageways to said linear action motor, an arm extending laterally from said headpiece and mounted for linear movement with said headpiece, valve means mounted on said forward portion of said housing and arranged to control the operation of said pressure-operated valve means, and means adjustably mounted on said arm to actuate said valve means on said housing for limiting the forward movement of said linear action motor.

2. A compact power tool of the character described comprising, means defining a housing including a forward portion and a rear tubular portion, a piston in said tubular portion, a hollow piston rod extending from said piston to define a fluid linear action motor, a hollow headpiece supported for linear movement within said housing and secured for movement by said piston rod, passageways connecting the interior of said piston rod and said headpiece, a rotary fluid motor mounted in said headpiece and adapted to receive a supply of fluid through said passageways, valve means in said passageways for stopping said rotary fluid motor, means for mounting a cutting tool for rotation by said rotary motor and for linear movement with said piston rod and headpiece, a fitting extending from said tubular portion and including passageways for supplying fluid under pressure separately to said linear action motor and to said rotory motor, pressure-operated valve means mounted within said fitting for controlling fluid flow through said passageways to said linear action motor, an arm extending laterally from said headpiece and mounted for linear movement with said headpiece, limit valve means mounted on said forward portion of said housing and adapted to control the operation of said pressure-operated valve means, and means adjustably mounted on said arm and adapted to actuate said forward limit valve means on said housing for stopping the forward movement of said linear action motor.

3. A compact power tool of the character described comprising, means defining a housing including a forward portion and a rear tubular portion, a piston slidably mounted in said tubular portion to define a fluid linear action motor, a hollow piston rod extending from said piston and forming a passageway including a shoulder therein, a hollow headpiece supported for linear movement within said housing and secured for movement by said piston rod, passageways connecting the interior of said piston rod and said headpiece, a rotary fluid motor mounted in said headpiece and adapted to receive a supply of fluid through said passageways, means for mounting a cutting tool for rotation by said rotary motor and for linear movement with said piston rod and said headpiece, a fitting extending from said tubular portion and including passageways for supplying fluid pressure to said linear action motor and to said rotary motor, a stationary hollow tube projecting from said fitting and adapted to telescope within said hollow piston rod, valve means loosely mounted within the end of said tube and adapted to engage said shoulder within said piston rod to cut off the supply of air to said rotary motor, pressure-operated valve means mounted within said fitting for controlling fluid through said passageways to said linear action motor, a pilot valve mounted on said forward portion of said housing and adapted to control the operation of said pressure-operated valve means, and an arm extending laterally from said headpiece and mounted for linear movement with said headpiece and adapted to actuate said pilot valve to limit the forward movement of said linear motor.

4. A compact power tool of the character described comprising, means defining a housing including a forward portion and a rear tubular portion, a piston slidably mounted in said tubular portion, a hollow piston rod extending from said piston to define a double-action linear motor, a hollow headpiece supported for linear movement within said housing and secured for movement by said piston rod, passageways connecting the interior of said piston rod and said headpiece, a rotary fluid motor mounted in said headpiece and adapted to receive a supply of fluid through said passageways, means for mounting a cutting tool for rotation by said rotary motor and for linear movement with said piston rod and said headpiece, a fitting extending from said tubular portion and including passageways for supplying fluid pressure to said linear action motor and to said rotary motor, a pair of pressure-operated valves mounted within said fitting for controlling fluid through said passageways to and from said linear action motor, an arm extending laterally from said headpiece and mounted for linear movement with said headpiece, pilot valve means mounted on said forward portion of said housing and connected to operate said pressure-operated valves simultaneously to reverse the operation of said linear action motor, screw means adjustably mounted on said arm and adapted to actuate said pilot valve means for limiting the forward movement of said linear action motor, and a casing surrounding said screw means and adapted to contain said screw means during the linear movement of said screw means with said headpiece.

5. A compact power tool of the character described, comprising, a housing including a tubular portion, a piston slidably mounted in said tubular portion, a hollow piston rod extending from said piston to define a double-action linear motor, a hollow headpiece supported for linear movement within said housing by said piston rod, passageways connecting the interior of said piston rod and said headpiece, a rotary fluid motor mounted in said headpiece and adapted to receive a supply of fluid through said passageways, means for mounting a cutting tool for rotation by said rotary motor and for linear movement with said piston rod and said headpiece, a fitting extending from said tubular portion and including passageways for supplying fluid pressure to said linear action motor and to said rotary motor, a pair of check valves, a pair of throttle valves and a pair of pressure-operated valves all mounted within said fitting, passage means connecting each of said pressure-operated valves in series with a parallel arrangement of one of said check valves and one of said throttle valves to control the feed and retraction of said double-action linear motor, pilot valve means mounted on said housing and connected to operate simultaneously both of said pressure-operated valves, and means extending from said headpiece to actuate said pilot valve means for limiting the movement of said linear action motor.

6. A compact power tool of the character described, comprising a housing having a cylinder portion, a piston slidably mounted in said cylinder portion and having a piston rod extending therefrom, said cylinder being closed at opposite ends of said piston and having a seal to said housing to define a double-action linear motor, a hollow headpiece supported for linear movement within said housing and having a connection to said piston rod, passageways formed through the interior of said piston rod and into said headpiece, a rotary fluid motor mounted in said headpiece and adapted to receive a supply of fluid through said passageways, means for mounting a cutting tool for rotation by said rotary motor and for linear movement with said headpiece, a fitting extending from said housing and including passageways for supplying fluid pressure separately to said linear action motor and to said rotary motor, a pair of check valves, a pair of throttle valves and a pair of pressure-operated valves all mounted within said fitting, means connecting each of said pressure-operated valves in series with a parallel arrangement of one of said check valves and one of said throttle valves and adapted to control the feed and retraction of said double-action linear motor, pilot valve means mounted on said housing and connected to both of said pressure-operated valves for causing alternative operation thereof to reciprocate said piston, means extending from said headpiece to actuate said valve means on said housing for limiting the forward movement of said linear action motor, and a completion signal pilot valve mounted within said fitting and adapted to be actuated by said piston at the end of its return stroke.

7. A compact power tool of the character described, comprising, a housing including a tubular portion, a piston slidably mounted in said tubular portion, a piston rod extending from said piston to define a tool feeding motor, a hollow headpiece connected to said rod and supported for linear movement within said housing, a rotary fluid motor mounted in said headpiece, means for mounting a cutting tool for rotation by said rotary motor and for linear movement with said piston rod and said headpiece, a fitting extending from said tubular portion and including passageways for supplying feeding pressure fluid to said feeding motor and driving pressure fluid to said rotary motor, a check valve, a throttle valve connected in parallel circuit with said check valve, a pressure-operated valve mounted within said fitting and connected in series with the parallel arrangement of said check valve and said throttle valve and adapted to control the speed of said tool feeding motor, pilot valve means mounted on said housing and connected by a passageway to said pressure-operated valve, means extending from said headpiece to actuate said pilot valve means for limiting the forward movement of said feeding motor, and a manually operable valve mounted concentrically within said pressure-operated valve and adapted to actuate said pressure-operated valve independently of said pilot valve means.

8. A compact power tool of the character described, comprising, a housing including a tubular portion, a piston slidably mounted in said tubular portion, a hollow piston rod extending from said piston to define a double-action tool feeding motor, a hollow headpiece connected for movement within said housing with said piston rod, passageways connecting the interior of said piston rod and said headpiece, a rotary fluid motor mounted in said headpiece and adapted to receive a supply of fluid through said passageways, valve means in said passageways for stopping said rotary fluid motor, means for mounting a cutting tool for rotation by said rotary motor and for feeding and retracting movement with said piston rod and said headpiece, a fitting extending from said tubular portion opposite said headpiece and including passageways for supplying fluid pressure to both said feeding motor and to said rotary motor, direction controls for said feeding motor including a pressure-operated feed valve and a pressure-operated retraction valve mounted separately within said fitting, each of said pressure-operated valves having connected in series with it a throttle valve through which fluid can flow from said feeding motor to the associated pressure-operated valve and a check valve arranged to by-pass flow from the pressure-operated valve around the throttle valve to said feeding motor and to control the direction and rate of said double-action linear motor, pilot valve means mounted on said housing and connected by passageways to shift both of said pressure-operated valves in opposite directions, an arm extending from said headpiece, means adjustably mounted on said arm and adapted to actuate said pilot valve means for limiting the forward movement of said feeding motor, a manually operable start valve mounted concentrically within said pressure-operated retraction valve and connected to actuate both of said pressure-operated valves, and a completion signal valve mounted within said fitting and adapted to be actuated by said piston.

9. In a compact power tool of the character described comprising, a housing including a tubular portion, a piston slidably mounted in said tubular portion to define a linear action tool feeding motor, a hollow piston rod extending from said piston and including a passageway having an internal shoulder, a hollow headpiece supported for linear movement within said housing and connected to said piston rod, passageways connecting the interior of said piston rod and said headpiece, a rotary fluid motor mounted in said headpiece and adapted to receive a supply of fluid through said passageways, means for mounting a cutting tool for rotation by said rotary motor and for linear tool feeding movement with said headpiece, a fitting extending from said tubular portion at the opposite end from said headpiece and including separate passageways for supplying fluid pressure to both said motors, a hollow tube projecting from said fitting and adapted to telescope within said hollow piston rod, valve means loosely mounted within the end of said tube and adapted to engage said shoulder when said tube and said rod are telescoped to cut off the air supply to said rotary motor, pressure-operated valve means mounted within said fitting for controlling fluid flow through said passageways to said tool feeding motor, an arm mounted for linear movement with said headpiece, a pilot valve mounted on said housing and connected to shift the operation of said pressure-operated valve means from a feeding to a retracting mode, means adjustably mounted on said arm to actuate said pilot valve on said housing for limiting the forward movement of said linear action motor, and a two-way diverting valve mounted within said fitting and operable by said piston of said feeding motor in its retracted position for diverting a flow of pressure fluid from said valve means to provide a completion signal.

References Cited by the Examiner

UNITED STATES PATENTS

| | | | |
|---|---|---|---|
| 2,873,630 | 2/1959 | Eschenburg et al. | 77—33.5 |
| 3,041,897 | 7/1962 | Linsker | 77—33.5 |
| 3,141,509 | 7/1964 | Bent | 173—19 |
| 3,195,658 | 7/1965 | Reed et al. | 173—19 |
| 3,204,706 | 9/1965 | Jonsson | 173—19 |

FRED C. MATTERN, JR., *Primary Examiner.*

L. P. KESSLER, *Assistant Examiner.*